United States Patent Office 3,466,099
Patented Sept. 9, 1969

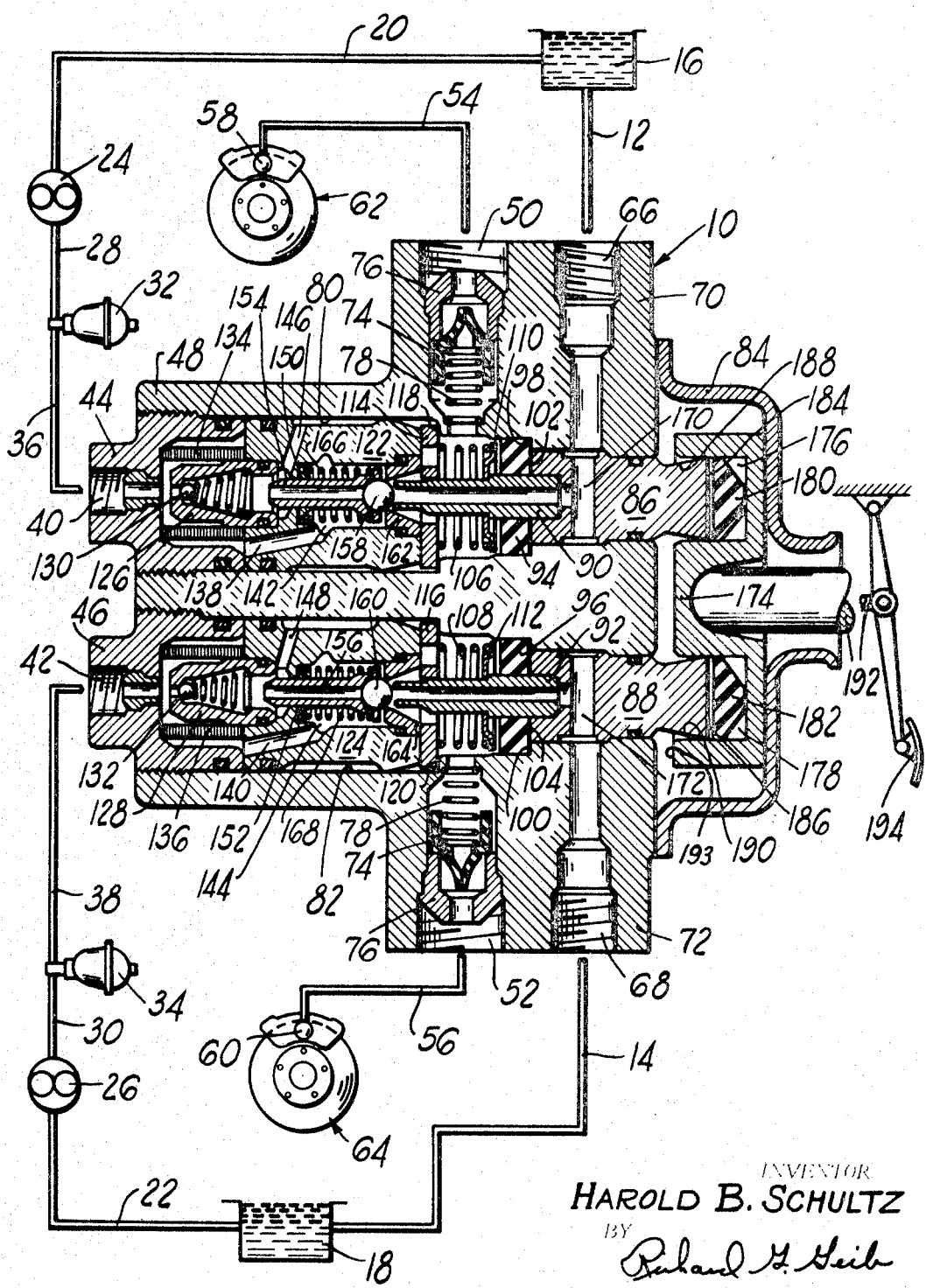

3,466,099
FLUID PRESSURE CONTROL VALVE
Harold B. Schultz, South Bend, Ind., assignor to The Bendix Corporation, a corporation of Delaware
Filed Mar. 6, 1968, Ser. No. 710,943
Int. Cl. B60t 15/06, 15/12
U.S. Cl. 303—52                                  17 Claims

ABSTRACT OF THE DISCLOSURE

A fluid pressure control valve having at least two valve means operated by a common actuating means including a resilient connector for equalizing input forces to the valve means.

Summary

Recent legislation has required that vehicles incorporate duo-mode operation for brake systems. It has been complied with by those skilled in the art by the incorporation of a split master cylinder with a vacuum or air servomotor so as to provide separate hydraulic pressures for separate portions of the vehicle brakes. Such systems have generally been designed around a fixed displacement requirement for the hydraulic system. Other prior art devices have also been observed where two hydraulic pressure sources may be controlled by separate valves by a common actuator to provide similar duo-mode systems. A typical example of the latter type of braking system is observed in U.S. Patent No. 2,590,587.

It is a principal object of this invention to improve upon the structures of the latter type by incorporating a resilient connection in the actuator linkage that is adapted to provide equal input forces to the valves of such a divided full hydraulic power system.

Another related object of this invention is to provide such a valve with a limited amount of travel, due to the resilient connection, so as to provide better feel for the operator of the valve, i.e., feel that is more easily recognizable to an operator who has been previously acquainted with air or vacuum over hydraulic type systems.

A more detailed description of the objects of this invention resides in the provisioning of shaped rubber disc between a link operatively connected to an operator-operated control means at its central point, which rubber disc connect the link to separate valve plungers of the separate valve means such that limited angular motion is permitted in the link to equalize input forces form the operator-operated control member to the separate valve plungers as well as permitting, by compression of the shaped rubber disc, limited travel of the link and operator-operated control member of a greater portion than that attributable to the valve plungers during the operation thereof by the operator-operated control member.

Drawing description

The single sheet of drawings shows a schematic full power hydraulic braking system for an automotive vehicle employing disc brakes with the control valve being shown in a cross sectioned side view.

Detailed description

While it should be noted that the valve apparatus of this invention is applicable to any hydraulic system, as those skilled in the art to which it relates, will undoubtedly recognize, it has occurred to the inventor to be particularly applicable in a full hydraulic power braking system. In such a system a valve 10 embodying the principles of this invention is connected by conduits 12 and 14 to reservoirs 16 and 18, respectively. If desired, the reservoirs 16 and 18 may be combined so that there is but one common reservoir for the valve 10. Conduits 20 and 22 connect the reservoirs 16 and 18 to pumps 24 and 26 which are in turn connected by conduits 28 and 30 to accumulators 32 and 34. The pumps 24 and 26 are of a type well known within the skill of the art that incorporate by-pass provisions for circulating the fluid therefrom back to the reservoir whenever the pressure in the accumulators 32 and/or 34 has reached a desired value. The accumulators 32 and 34 are connected by conduits 36 and 38 to separate fluid inlet ports 40 and 42 provided by plugs 44 and 46 threadedly assembled to the housing 48 of the valve 10. The housing 48 is provided with discharge ports 50 and 52, which are separate from each other, and to which conduits 54 and 56 communicate the discharge ports to disc brake motors 58 and 60 of the front brake 62 and the rear brake 64, respectively, of the vehicle in which the valve 10 is employed. Before leaving this general description, it should be noted that return ports 66 and 68 to which the conduits 12 and 14 are connected are also machined within the upper and lower bosses 70 and 72 accommodating the discharge ports 50 and 52. Furthermore, residual check valve means, in the form of a resilient duck bill member 74 biased onto a ferrule 76 by springs 78 between the bottom of the ports 50 and 52 and the valve 74, may be utilized to maintain a slight residual pressure in the conduits 54 and 56. It will be readily recognized by those skilled in the art to which this invention relates that certain disc brake apparatus does not require residual brake pressure maintenance and therefore these residual valves 74 may be eliminated from the discharge side of the valve 10.

The housing 10 is, in the embodiment shown, provided with parallel stepped bores 80 and 82 in which the valve means is assembled and held therein upon the joining of the plugs 44 and 46 within the open end of the forward face of the housing 48. These bores 80 and 82 open also on a rearward face of the housing 48. However a cover 84 is affixed to the housing, as by bolts, to prevent contaminants from accumulating at this open end of the bores 80 and 82 and the structure. Valve plungers 86 and 88 having ends projecting into the area of the cover 84 are grooved for O-ring seals and are slidably carried in the smaller portion of the parallel bores 80 and 82, respectively. The O-ring seals on the plungers 86 and 88 maintain the integrity of the compartments within the housing between the respective plugs 44 and 46 and the valve plungers 86 and 88.

Within these compartments the valve means is pre-assembled prior to the joinder of the plugs 44 and 46, which valve means comprises hollow projections 90 and 92 loosely assembled to each of the plungers 86 and 88 and rubber reaction discs 94 and 96 assembled about the hollow plungers 90 and 92 to bear against shoulders 98 and 100 of the housing 48, at the point where the parallel bores 80 and 82 are stepped down to their smallest diameter, and against the faces 102 and 104 of the valve plungers 86 and 88. The effective area of faces 102 and 104 is chosen to transmit reaction forces desired to the opeartor during the operation of the valve means.

Also within the compartments are valve return springs 106 and 108 between spring retainer plates 110 and 112 carried by the hollow plungers 90 and 92 and plates 114 and 116 held against shoulders 118 and 120 of the bores 80 and 82 by means of valve housings 122 and 124 positioned in the bores 80 and 82 by the plugs 44 and 46, respectively. The valve housings 122 and 124 have retained to their forward end relief valves 126 and 128 comprising simple spring biased ball valves 130 and 132 whose faces are exposed to hydraulic pressure of the inlet ports 40 and 42. About the relief valves 126 and 128 annular filter 134 and 136 are located to be between the inlet ports 40 and 42 and passages 138 and 140 in the respective valve housings 122 and 124 leading to respective valve chambers 142 and 144 within the housings. Chambers 142 and 144 are closed from pressure relief passages 146 and 148 in the valve housings 122 and 124 by means of seals 150 and 152 about valve stems 154 and 156 to which are press fitted steel balls 158 and 160 forming the support poppet valve assembly.

As previously mentioned, the pumps 24 and 26 include provisions for circulating fluid back to their respective reservoirs whenever the pressure in the accumulators 32 and/or 34 has reached the desired value. If, however, these provisions fail, and the accumulators 32 and 34 provide excessive pressure via inlet ports 40 and 42, the filters 134 and 136, and the passages 138 and 140 to the respective valve chambers 142 and 144; the relief valves 126 and 128 are forced open allowing pressurized fluid to flow through pressure relief passages 146 and 148 to the discharge ports 50 and 52, thereby precluding structural damage to the valve 10.

Valve seats 162 and 164 are assembled within the rear face of the valve housings 122 and 124 to cooperate with the steel balls 158 and 160 urged by valve springs 166 and 168 thereagainst. These seats 162 and 164 can be stacked or press fitted to the housings for assembly purposes.

As seen, and when assembled, the hollow plungers 90 and 92 have a forward face adapted for abutment with the steel balls 158 and 160 to terminate communication of the discharge ports 50 and 52 with the return ports 66 and 68 via passages 170 and 172 in the plungers 86 and 88, respectively. It should also be noted that the rearwardly positioned face of the valve housings 122 and 124 are not provided with seal means cooperating with the bores 80 and 82; whereas the forward faces are provided with O-ring type seals, as is the inward portion of the plugs 44 and 46 to maintain the integrity of the hydraulic pressure source supplied to the valve chambers 142 and 144. The valve stems 154 and 156 are preferably of hollow construction so that any hydraulic pressure fluid coming between the steel balls 158 and 160 and these stems 154 and 156 can be passed to the reservoirs 16 and 18 via the pressure relief passages 146 and 148 past the nonsealed end of the housings as would pressure ported thereto by the relief valves 126 and 128.

Within the cover 84 for the rearward face of the housing 48 a cap or link 134 is provided having spaced cavities 176 and 178 within which cone shaped rubber disc or members 180 and 182 are operatively positioned between faces 184 and 186 of the respective plungers 86 and 88. The cone shaped rubber members, or similar resilient means, 180 and 182 is so positioned as to have its apex, or area of smaller diameter, operatively abutting the bottom of the cavities 176 and 178 with its largest diameter or base portion exerting force over substantially the entire area of the faces 184 and 186. These faces 184 and 186 have limited axial dimension so that the cap 174 may move angularly with respect to the plungers 86 and 88. In this regard, the ends of the plungers 86 and 88 are machined to have a tapered peripheral surface 188 and 190 converging toward the rearward face of the housing 48 to also aid in the limited angular movement of the cap 174. Cap 174 is abuttingly connected to a push rod 192 that is affixed to a brake pedal 194 under the control of the operator of the vehicle within the operator's compartment. It is also noted that upon a failure to provide pressurized fluid to either one of the inlet ports 40 or 42, the plungers 86 or 88 would move completely to the left, whereby an annular ledge 193 of the link 174 would abut the housing 10 in response to a braking application. If, for example, a pressure failure occurred at accumulator 34, the plunger 88 would move to the left in response to a depression of the brake pedal 194. The annular ledge 193 will then be abutting the housing 10 immediately beneath the plunger 88 so as to serve as a pivot point for link 174 with respect to said housing 10. This pivotal action provides the link 174 with a mechanical advantage in moving plunger 86 to the left to apply the brakes at wheel 62. Moreover, it is specifically mentioned that very little additional travel of push rod 192 and brake pedal 194 is required upon a failure of one or the other of the hydraulic lines in view of the normal operable proximity of the annular ledge 193 with respect to the housing 10.

Operation

In operation, an operator will depress brake pedal 194 to move the push rod 192 inwardly and carry with it the cap or link 174. The resiliency of the connectors such as the cone rubber discs 180 and 182 will permit travel for the push rod 192 of a greater proportion than that attributable to the valve plungers 86 and 88 in that the discs 180 and 182 are compressing during this part of the operation. Also, as the shape of the disc provide free space within the cavities 176 and 178, the cap 174 will be permitted to angularly adjust to equalize the amount of input force from the push rod 192 via the link 174 to the valve plungers 86 and 88.

The first movement of the valve plungers 86 and 88 closes off the return communication to the discharge ports 50 and 52, as aforementioned by lapping the hollow plungers 90 and 92 on the steel balls 158 and 160. In order to communicate the hydraulic pressure from the accumulators 32 and 34 within the valve chambers 142 and 144 further effort is required of the operator on the brake pedal 194. This further effort will unseat the steel balls 158 and 160 from the seats 162 and 164 of the valve housings 122 and 124 whereby fluid will flow outwardly from the chambers 142 and 144 to the discharge ports 50 and 52 about the hollow plungers 90 and 92. This fluid acts on discs 94 and 96 to provide reaction forces to the operator which when equal to input force lap the valves to discontinue flow.

Upon release of the brake pedal 194 the valve return springs 106 and 108 as well as the valve springs 166 and 168 will return the valve elements to the released attitude shown. If desired, an additional return spring may be provided on a brake pedal 94, as is familiar to those skilled in the art to which this invention relates.

I claim:
1. A hydraulic control valve comprising:
  a housing having at least two compartments consisting of bores open on the opposite faces of said housing which bores are disposed on opposite sides of an axes through the center of said housing, said housing having axially spaced, separate radial discharge and return ports communicable with each of said compartments;
  valve plunger means sealingly and slidably carried by said housing closing one open end of each of said bores, said plunger means having hollow projections and passage means therewithin communicating said hollow projection to said return ports for the respective compartment;
  deformable reaction means operably connected to each of said plunger means sealing said compartments ahead of said return ports from same save for said hollow plunger, said reaction means including an area effective on said housing to proportion reaction force between said housing and said plunger means;
  valve means in each of said compartments having poppet valves operably related to said projections to be operated thereby, said valve means being communicable with an inlet port for separate pressurized hydraulic fluid sources, said poppet valves having a normal position barring flow of said fluids whereby control chambers are created in said compartments between said valve means and said reaction means about said hollow projections, which control cham- bers are open to said respective discharge ports, said hollow projections thereby normally communicating respective discharge ports to respective return ports for said compartments, which communication is closed by abutting respective projections on respective poppet valves of said respective compartments; and actuating means for said valve plunger means, said actuating means having a cap operatively connected to an operator-operated means, which cap has cavities for receiving ends of said valve plunger means and a spring means between the bottom of said cavities and said means to provide a sense of travel and to equalize input forces to said means from said operator-operated push rod.

2. The structure of claim 1 wherein said spring means is two cone shaped rubber discs whose apex abuts said bottom of said cavity and whose base abuts said means in each of said cavities.

3. The structure of claim 2 wherein said means are fitted within said cavities such that said actuating means may be angularly displaced with respect to said means in accordance with the limitations of said rubber discs to equalize input forces to said mans.

4. The structure of claim 3 wherein said means have a circular face of limited axial length and converging necks between said face and said member at the openings of the compartments of said housing to permit such angular motion of said cap.

5. A hydraulic control valve comprising:
a housing having at least two compartments consisting of bores open on the opposite faces of said housing which bores are concentric with respect to an axes through the center of said housing, said housing having axially spaced, separate radial discharge and return ports communicable with each of said compartments;

valve plunger means sealingly and slidably carried by said housing closing one open end of each of said bores, said plunger means having hollow projections and passage means therewithin communicating said hollow projection to said return ports for the respective compartment;

deformable reaction means operably connected to each of each plunger means sealing said compartments ahead of said return ports from same save for said hollow plunger, said reaction means including an area effective on said housing to proportion reaction force between said housing and said plunger means;

valve means in said compartments having poppet valves operably related to said projections to be operated thereby, said valve means being communicable with an inlet port for separate pressurized hydraulic fluid sources via a plug means affixed to said housing closing the other ends of said bores, said poppet valves having a normal position barring flow of said fluids whereby control chambers are created in said compartments between said valve means and said reaction means about said hollow projections, which control chambers are open to said respective discharge ports, said hollow projections thereby normally communicating respective discharge ports to respective return ports for said compartments, which communication is closed by abutting respective projections on respective poppet valves of said respective compartments; and means to actuate said valve plunger means having an operator-operated means connected thereto by link means which is resiliently joined with said valve plungers.

6. The structure of claim 5 wherein said link means comprises a cap having cavities within which ends of said plungers extending beyond said housing is received with said spring means being placed between the bottom of said caviities and said plungers to permit angular alignment of said cap whereby equal input forces are delivered to said plunger means such that equal hydraulic pressures are provided at said discharge ports with both sources working, said cap means being operably related to said housing to permit operation of one valve means regardless of the operable condition of the other valve means, as when hydraulic pressure at one inlet port is inadequate, with a similar force requirement as if both valve means were supplied with adequate hydraulic pressure 7. The structure of claim 6 wherein said spring means is a shaped rubber disc compressible towards the bottom of said cavities.

8. The structure of claim 7 wherein the ends of said valve plunger means are shaped to permit limited angular motion of said cap.

9. The structure of claim 8 wherein the said discs are cone shaped with their apexes bearing on the bottom of said cavities and their bases abut a flange of limited axial dimension slidable in said cavities.

10. A hydraulic control valve for a full hydraulic power brake system with separate actuable means being separately controlled which valve has a housing with parallel bores each of which has assembled from one end thereinto valve means, said actuatable means being so arranged to normally communicate said actuatable means to separate return ports, said valve means being operated to open separate hydraulic pressures to said actuatable means upon operation of said valve, said valve being characterized by improvement to its acuting means as follows:
an operator-operated member; and
means operatively connected to said operator-operated member and a spring connected to said actuatable means, the spring being such as to equalize input forces to said valve means and to operate one of said valve means independently of the other of said valve means by said means being pivotal on said housing to provide a mechanical advantage for operating one valve means when the other is inoperable without substantial increased travel over that required when both valve means are operable.

11. The structure of claim 10 wherein the spring is a cone shaped disc whose base abuts said valve means and whose apex abuts said means operatively connected to said operator-operated member such that it permits radial motion of said means.

12. A hydraulic control valve comprising:
a housing having a bore open at least at one end and spaced discharge and return ports;
valve means in said bore having valve plunger means with an end extending from and a hollow projection extending into said bore, and said valve means having a valve housing in said bore with a normally closed poppet valve in a valve chamber thereof and a pressure relief valve, said valve housing having a first passage leading to said poppet valve and a second passage leading from said relief valve, said relief valve and said first passage being open to and in an inlet chamber formed by said bore and said housing for pressurized fluid, respectively;
a fluid filter means in inlet chamber about said relief valve in the flow path from an inlet port for pressurized fluid to said first passage such that said inlet port is communicated directly to said relief valve; and
operator-operated means connected to said valve plunger and thereby to operate said poppet valve including mechanism operable to provide travel to said plunger which is proportionally less than travel of said operator-operated means.

13. The structure of claim 12 wherein said housing has parallel bores each with discharge, return and inlet ports, and two valve means one for each bore operable by a link having spaced cavities receiving spaced ends of valve plungers which are each provided with a circular face having a limited axial surface supported by walls of said cavities with a variable rate spring between the face and bottoms of said cavities, said spring functioning as said mechanism and to equate input force to said valve plungers.

14. The structure of claim 12 wherein said second passage communicates with said return port about a nonsealed end of said valve housing opposite a sealed end facing said inlet chamber.

15. The structure of claim 12 wherein said poppet valve comprises a hollow stem and ball assembly with the opening of the hollow stem opposite the end to which the ball is press fitted being communicable with said second passage.

16. The structure of claim 15 wherein said poppet valve and said relief valve are axially aligned.

17. The structure of claim 12 wherein said valve housing has a replaceable valve seat for said poppet valve, which valve seat has an opening larger than and aligned with said hollow projection adapted to operate said poppet valve in line therewith.

References Cited
UNITED STATES PATENTS

| | | | |
|---|---|---|---|
| 2,976,608 | 3/1961 | Brueder | 303—52 X |
| 3,003,825 | 10/1961 | Kemble | 303—54 |

MILTON BUCHLER, Primary Examiner

J. J. McLAUGHLIN, JR., Assistant Examiner

U.S. Cl. X.R.

60—52; 137—596.2, 627.5; 303—10, 54, 56